(12) United States Patent
Woo et al.

(10) Patent No.: US 11,264,626 B2
(45) Date of Patent: Mar. 1, 2022

(54) HEAT EXCHANGE DEVICE AND FUEL CELL SYSTEM USING THE SAME

(71) Applicant: LG ELECTRONICS INC., Seoul (KR)

(72) Inventors: Hyoung Suk Woo, Seoul (KR); Dong Keun Yang, Seoul (KR); Woojin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 16/785,926

(22) Filed: Feb. 10, 2020

(65) Prior Publication Data

US 2020/0259192 A1    Aug. 13, 2020

(30) Foreign Application Priority Data

Feb. 11, 2019   (KR) .................. 10-2019-0015780

(51) Int. Cl.
| | |
|---|---|
| *H01M 8/04007* | (2016.01) |
| *H01M 8/04014* | (2016.01) |
| *H01M 8/04223* | (2016.01) |
| *H01M 8/04701* | (2016.01) |
| *H01M 8/0612* | (2016.01) |

(52) U.S. Cl.
CPC ... *H01M 8/04074* (2013.01); *H01M 8/04014* (2013.01); *H01M 8/04253* (2013.01); *H01M 8/04701* (2013.01); *H01M 8/0618* (2013.01)

(58) Field of Classification Search
None
See application file for complete search history.

(56) References Cited

U.S. PATENT DOCUMENTS

2019/0081335 A1*   3/2019   Shinozaki ......... H01M 8/04708

FOREIGN PATENT DOCUMENTS

| KR | 10-0664086 | 1/2007 |
|---|---|---|
| KR | 10-2011-0124027 | 11/2011 |
| KR | 10-2016-0101548 | 8/2016 |

OTHER PUBLICATIONS

KR20160101548A—machine translation (Year: 2016).*
European Search Report issued in application No. 20156389.7 dated Jul. 15, 2020.

* cited by examiner

*Primary Examiner* — Haroon S. Sheikh
(74) *Attorney, Agent, or Firm* — Ked & Associates LLP

(57) ABSTRACT

Disclosed herein is an integrated multiple heat exchange device and a fuel cell system using the same. The integrated multiple heat exchange device includes a plurality of heat exchangers for consecutively collecting heat contained in a plurality of gases that are present in the fuel cell system and that have different temperatures, wherein the plurality of heat exchangers are separated from each other, a porous separator is placed between the plurality of heat exchangers such that condensate is collected at a lowermost heat exchanger, and a coolant line penetrates a separator to pass through all the plurality of heat exchangers.

20 Claims, 7 Drawing Sheets

(a)

(b)

HEAT EXCHANGE DEVICE AND FUEL CELL SYSTEM USING THE SAME

CROSS-REFERENCE TO RELATED APPLICATION

This application claims priority to and the benefit of Korean Patent Application No. 10-2019-0015780, filed in Korea on Feb. 11, 2019, the disclosure of which is incorporated herein by reference in its entirety.

BACKGROUND

1. Field

The present disclosure relates to a heat exchange device for a fuel cell system.

The present disclosure also relates to a fuel cell system including a heat exchange device.

2. Background

A fuel cell system is to change chemical energy of fuels into electric energy through an electrochemical reaction. The system includes a fuel reforming device and a fuel cell stack. The fuel reforming device is to change hydrocarbon-based fuels into hydrogen such that hydrogen is supplied to a fuel cell stack. In the fuel cell stack, electric energy is generated through an electrochemical reaction between hydrogen and oxygen supplied by the fuel reforming device.

In order to prevent lowered efficiency of the fuel reforming device and the fuel cell stack, moisture contained in various gases discharged from the fuel reforming device and the fuel cell stack needs to be removed.

In the process of removing the moisture contained in various gases, condensate is generated. The condensate needs to be managed. Otherwise, the fuel reforming device and the fuel cell stack can have lowered efficiency, or, due to freezing, can operate incorrectly or cannot work.

FIG. 1 illustrates a heat exchange device for a fuel cell system of the related art.

Referring to FIG. 1, the heat exchange device 130 of the related art includes a first gas-liquid separator 131, a second gas-liquid separator 132, and a condensate storage part 133.

The first gas-liquid separator 131 condenses and separates moisture contained in anode-off gases (AOG) of a fuel cell stack. To this end, anode-off gases are entered into the first gas-liquid separator 131 through an anode-off gas supply line 152, and coolants are entered into the first gas-liquid separator 131 through a coolant supply line 161.

The second gas-liquid separator 132 condenses and separates moisture contained in reformed gases that are products of a fuel reforming device. To this end, reformed gases are entered into the second gas-liquid separator 132 through a reformed gas-supply line 152, and coolants are entered into the second gas-liquid separator 132 through the coolant supply line 162.

The condensate storage part 133 is integrated into the first gas-liquid separator 131 and the second gas-liquid separator 132 to directly communicate with the first gas-liquid separator 131 and the second gas-liquid separator 132. Condensate generated in the first gas-liquid separator 131 and the second gas-liquid separator 132 is stored in an inner space of the condensate storage part. The condensate stored in the condensate storage part 133 is discharged outwards through the opening of a valve 173 provided at the condensate discharge line 172.

The heat exchange device of the related art in FIG. 1 has a structure in which the first gas-liquid separator 131 and the second gas-liquid separator 132 communicate with each other. As the first gas-liquid separator 131 and the second gas-liquid separator 132 communicate with each other, gases subject to heat exchange in each of the first gas-liquid separator 131 and the second gas-liquid separator 132 have to be the same sort of gases. Accordingly, gases supplied to the heat exchange device in FIG. 1 are of the same sort as hydrogen gases supplied by an anode of a fuel cell stack and hydrogen gases supplied by a fuel reforming device. When gases subject heat exchange in each of the first gas-liquid separator 131 and the second gas-liquid separator 132 are different, gases except hydrogen may be included in reformed gases due to a combination of the gases, resulting in lowered efficiency of the fuel cell stack.

Further, as for the heat exchange device in FIG. 1, coolants are discharged from the first gas-liquid separator 131, pass through an external line, and then are supplied to the second gas-liquid separator 132 because the first gas-liquid separator 131 and the second gas-liquid separator 132 are spaced a predetermined distance apart from each other.

The above-described arrangement of the first gas-liquid separator 131 and the second gas-liquid separator 132, and the above-described form of the coolant supply line 161, 162 lead to an increase in volume of a fuel cell system.

SUMMARY

The present disclosure is directed to a multiple heat exchange device that has an integrated structure in which heat contained in a plurality of gases having different temperatures may be efficiently collected.

The present disclosure is also directed to a heat exchange device that has a structure in which condensate, generated in a plurality of heat exchangers separated from each other, may be discharged through a single discharge part.

The present disclosure is also directed to a fuel cell system that may reduce parasitic power using a multiple heat exchange device.

Aspects of the present disclosure are not limited to the above-described ones. Additionally, other aspects and advantages that have not been mentioned may be clearly understood from the following description and may be more clearly understood from embodiments. Further, it will be understood that the aspects and advantages of the present disclosure may be realized via means and combinations thereof that are described in the appended claims.

As a means to implement the above-described aspects, the present disclosure provides a multiple heat exchange device in which a plurality of heat exchangers for collecting heat contained in a plurality of gases that are present in a fuel cell system and that have different temperatures are formed in a single module.

In a fuel cell system, there are various gases such as cathode exhaust gases, reformed gases, burner exhaust gases and the like. Temperatures of the gases may be generally tens of degrees Celsius (° C.) or higher, and may also be above 100° C. Accordingly, heat contained in the gases needs to be collected. The collected heat may be reused in the fuel cell system or may be used to raise a temperature of water stored in a hot water tank. When heat exchange occurs in relation to various gases in the fuel cell system individually, a large number of heat exchange devices are required. Thus, volume of the fuel cell system is increased. When a plurality of heat exchangers are integrally formed in a single module, a compact fuel cell system may be ensured. Additionally, when a plurality of heat exchangers are integrally formed in a single module, a length of a coolant line may be shortened.

Specifically, a heat exchange device for a fuel cell system according to the present disclosure includes a lower heat exchanger, an upper heat exchanger, and a coolant line, and the lower heat exchanger and the upper heat exchanger are separated by a separator. Additionally, an additional heat exchanger may be placed between the lower heat exchanger and the upper heat exchanger.

The upper heat exchanger, for example, collects heat contained in a first gas having a relatively high temperature like reformed gases discharged from a reformer, while the lower heat exchanger collects heat contained in a second gas having a relatively low temperature like exhaust gases discharged from a cathode.

The coolant line is formed to pass through all the lower heat exchanger and the upper heat exchanger such that heat exchange occurs between coolants in the coolant line and each of the first and the second gases. The coolant line penetrates a separator to pass through all the lower heat exchanger and the upper heat exchanger.

An inlet of the coolant line may be placed at the lower heat exchanger, and an outlet of the coolant line may be placed at the upper heat exchanger. Accordingly, heat exchange may occur between coolants and the second and first gases consecutively. For example, primary heat exchange occurs between coolants and the second gas having a relatively low temperature in the lower heat exchanger. Through the primary heat exchange, a temperature of the coolants is raised. Then secondary heat exchange occurs between the coolants and the first gas having a relatively high temperature in the second heat exchanger. Through the secondary heat exchange, the temperature of the coolants is further raised.

Through the heat exchange between the coolants and the first gas and through the heat exchange between the coolants and the second gas, condensate may be generated in the upper heat exchanger and the lower heat exchanger. To collect the condensate, a condensate storage container may be placed on a bottom of each of the upper heat exchanger and the lower heat exchanger.

As a means to implement the above-described aspects, the present disclosure provides an integrated multiple heat exchange device that includes a plurality of heat exchangers to collect heat contained in a plurality of gases which are present in a fuel cell system and which have different temperatures, all together, and that includes a separator having a plurality of condensate discharge holes which allow condensate generated in one heat exchanger to be discharged to another heat exchanger.

When heat exchange occurs in relation to each of the gases in the fuel cell system individually, every heat exchange device requires a condensate collection line, and the condensate collection line includes a valve. Additionally, for turn-on and turn-off operations of the valve, electric energy is required, and electricity generated in the fuel cell system is usually used as the electric energy. As an increase in the number of condensate collection lines leads to an increase in the number of valves, a large amount of electric energy is required for turn-on and turn-off operations of the valves. Accordingly, condensate generated in different heat exchangers needs to be collected in a single heat exchanger. An integrated multiple heat exchange device according to embodiments of the present disclosure includes a separator having a plurality of condensate discharge holes through which condensate may pass. For example, condensate generated in an upper heat exchanger may pass through the condensate discharge holes of the separator and may be discharged to a lower heat exchanger. Additionally, a condensate discharge line including a valve may be connected to the lower heat exchanger. Thus, condensate generated in a plurality of heat exchangers may be discharged out of the heat exchange device through a single condensate discharge line. Preferably, the separator may be implemented as a porous separator.

A condensate storage container may be additionally placed on a bottom of the upper heat exchanger. The condensate storage container, placed on the bottom of the upper heat exchanger, includes a storage part and a guide part. The guide part guides condensate generated in the second heat exchanger to the storage part. To this end, the guide part may have a cross section in which a width of the guide part becomes wider towards an upper portion of the guide part.

The upper heat exchanger needs to be separated from the lower heat exchanger. Specifically, in case gases entered into the upper heat exchanger or gases entered into the lower heat exchanger are reformed gases, another sort of gases has to be prevented from mixing with the reformed gases. Otherwise, efficiency of reaction in a fuel cell stack may be reduced. For a separation between the upper heat exchanger and the lower heat exchanger, an edge portion of the condensate storage container placed on the bottom of the upper heat exchanger may be coupled to an inner wall of the upper heat exchanger through the process of welding and the like.

Additionally, the method of water sealing may be applied to a central portion of the condensate storage container placed on the bottom of the upper heat exchanger. For example, water for sealing is stored in the storage part of the condensate storage container placed on the bottom of the upper heat exchanger, and the central portion of the upper heat exchanger may be water-sealed. Accordingly, although gases supplied to the lower heat exchanger pass through the condensate discharge holes of the separator, the gases may be prevented from being entered into the upper heat exchanger by the guide part of the condensate storage container of the upper heat exchanger and by the water for sealing stored in the storage part. When an amount of condensate generated in the upper heat exchanger is increased and the condensate overflows from the condensate storage container, the overflowing condensate may only be discharged to the lower heat exchanger through the condensate discharge holes of the separator.

As a means to implement the above-described aspects, the present disclosure provides a fuel cell system including the above-described integrated multiple heat exchange device. Gases, having different temperatures and discharged from a reformer and a fuel cell stack, may be supplied respectively to a plurality of heat exchangers of the integrated multiple heat exchange device.

An exemplary fuel cell system includes a reformer, a fuel cell stack, and a multiple heat exchange device.

The reformer changes hydrocarbon gases into hydrogen gases using vapor under conditions of high temperatures caused by heat of burner combustion. In the reformer, reformed gases and burner combustion gases are separated and discharged. The fuel cell stack includes an anode that receives reformed gases from the reformer, a cathode that receives air, and an electrolyte that is placed between the anode and the cathode.

The multiple heat exchange device includes a plurality of heat exchangers, a separator(s) that forms a boundary surface between the plurality of heat exchangers, and a coolant line that penetrates the separator(s) to pass through all the plurality of heat exchangers.

As an example, the multiple heat exchange device may include three heat exchangers. Approximately 65° C. of exhaust gases discharged from the cathode may be supplied to a lower heat exchanger, approximately 100° C. of reformed gases discharged from the reformer may be supplied to an intermediate heat exchanger on the lower heat exchanger, and approximately 150° C. of burner combustion gases discharged from the reformer may be supplied to an upper heat exchanger on the intermediate heat exchanger.

An upper separator and an intermediate separator have a plurality of condensate discharge holes respectively such that condensate generated in the upper heat exchanger and the intermediate heat exchanger is discharged to the lower heat exchanger. Additionally, a condensate discharge port connected to a condensate discharge line including a valve may be placed at the lower heat exchanger.

Condensate storage containers may be placed respectively on a bottom of the intermediate heat exchanger and on a bottom of the upper heat exchanger. Each condensate storage container may separate the upper heat exchanger, the intermediate heat exchanger and the lower heat exchanger from each other.

The heat exchange device for a fuel cell system includes a plurality of heat exchangers, which collect heat contained in a plurality of gases present in a fuel cell system and having different temperatures, are formed in a single module such that heat contained in the plurality of gases present in the fuel cell system and having different temperatures is collected all together, thereby ensuring a compact fuel cell system.

The heat exchange device for a fuel cell system includes a separator having a plurality of condensate discharge holes through which condensate generated in one heat exchanger may be discharged to another heat exchanger, such that condensate generated in the plurality of heat exchangers may be discharged out of the heat exchange device through a single condensate discharge line, thereby making it possible to reduce the number of valves for controlling discharge of condensate and to reduce parasitic power.

The heat exchange device for a fuel cell system includes a condensate storage container to which the method of water sealing is applied, thereby making it possible to separate the heat exchangers from each other.

BRIEF DESCRIPTION OF THE DRAWINGS

Embodiments are described in detail with reference to the following drawings, wherein.

DETAILED DESCRIPTION

Figure 1:
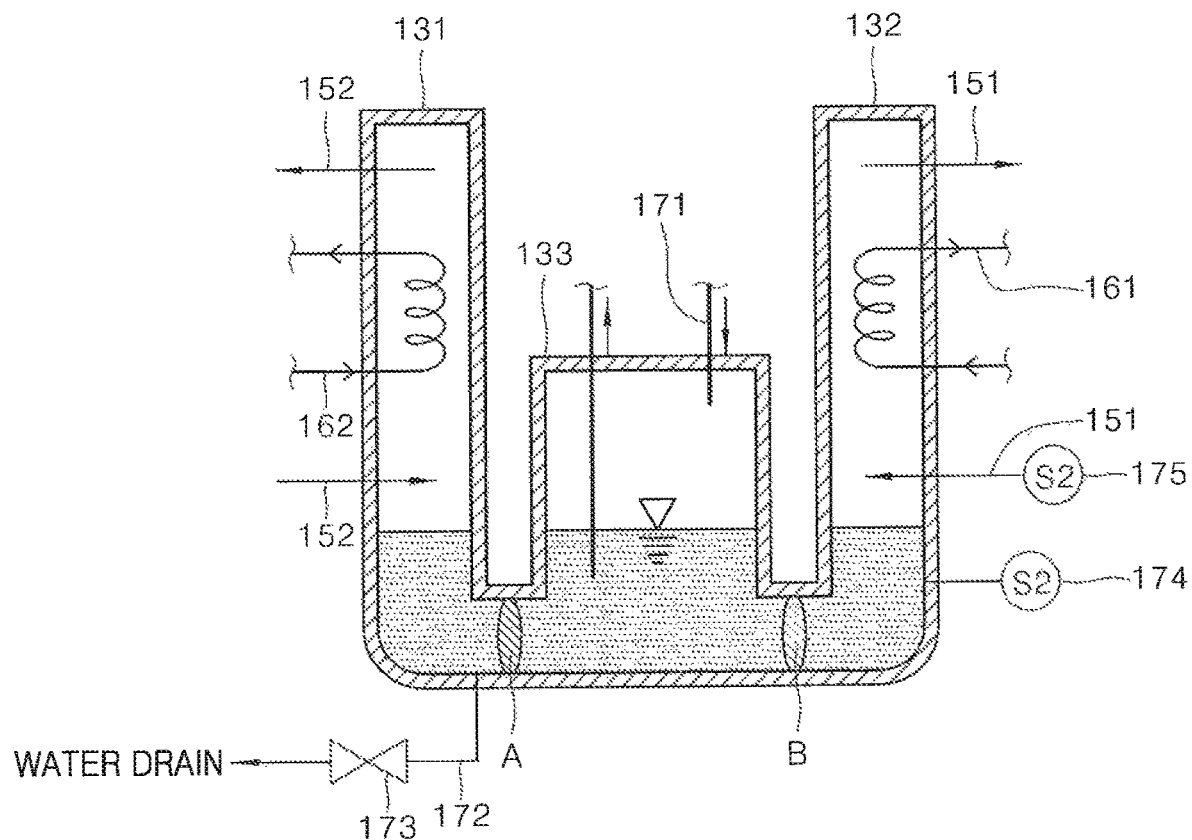
FIG. 1 is a schematic view illustrating a heat exchange device for a fuel cell system of the related art.

The above-described aspects, features and advantages are specifically described with reference to the accompanying drawings hereunder such that one having ordinary skill in the art to which the present disclosure pertains may easily implement the technical spirit of the disclosure. In describing the disclosure, detailed description of known technologies in relation to the disclosure is omitted if it is deemed to make the gist of the present disclosure unnecessarily vague. Below, preferred embodiments of the present disclosure are specifically described with reference to the accompanying drawings. Throughout the drawings, identical reference numerals denote identical or similar components.

Figure 2:
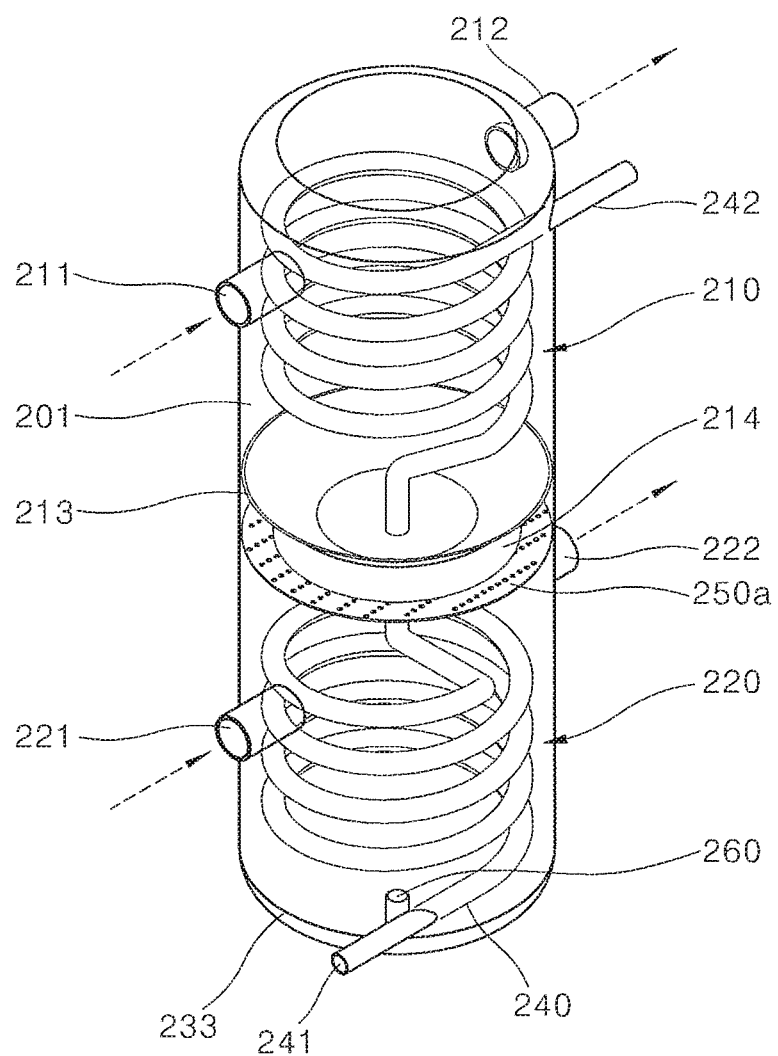
FIG. 2 is a schematic view illustrating an exemplary heat exchange device for a fuel cell system.

FIG. 2 is a schematic view illustrating an exemplary heat exchange device for a fuel cell system.

Referring to FIG. 2, the heat exchange device includes a first heat exchanger 210 and a second heat exchanger 220. The second heat exchanger 220 is placed under the first heat exchanger 210. In this specification, the first heat exchanger 210 is also referred to as an upper heat exchanger, and the second heat exchanger 220 is also referred to as a lower heat exchanger.

The first heat exchanger 210 and the second heat exchanger 220 are implemented in a single housing 201. The housing 201 may have the shape of a container such as a circle-shaped container and a square-shaped container, and may have a lateral wall, an upper surface and a lower surface. The lower surface of the housing 201 may be a second condensate storage container 233 of the second heat exchanger 220.

In a fuel cell system, there are various gases such as cathode exhaust gases, reformed gases, burner exhaust gases and the like. Temperatures of the gases are generally tens of degrees Celsius (° C.) or higher and may also be above 100° C. Accordingly, heat contained in the gases needs to be collected. The collected heat may be reused in the fuel cell system or may be used to raise temperature of water stored in a hot water tank.

The first heat exchanger 210 collects heat contained in a first gas in the fuel cell system. To this end, the first heat exchanger 210 includes a first gas inlet 211 through which the first gas is entered, and a first gas outlet 212 through which the first gas is discharged.

The second heat exchanger 220 collects heat contained in a second gas in the fuel cell system. A temperature of the second gas is different from a temperature of the first gas. To this end, the second heat exchanger 220 includes a second gas inlet 221 through which the second gas is entered, and a second gas outlet 222 through which the second gas is discharged.

A separator 250a forms a boundary surface between the first heat exchanger 210 and the second heat exchanger 220. In FIG. 2, an upper section of the separator 250a in the housing 201 forms the first heat exchanger 210, and a lower section of the separator 250a in the housing 201 forms the second heat exchanger 220. The separator 250a may also be a bottom of the first heat exchanger 210.

Figure 6:
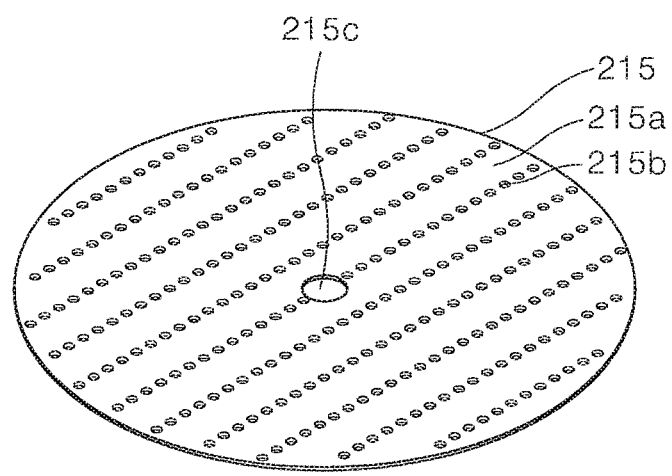
FIG. 6 is a view illustrating an example of a separator that is applicable to a heat exchange device for a fuel cell system according to the present disclosure.

Heat exchange occurs between the first and second gases and coolants flowing through a coolant line 240 respectively in the first heat exchanger 210 and the second heat exchanger 220. The coolant line 240 may have a coil shape in each of the heat exchangers. The coolant line 240 passes through all the first heat exchanger 210 and the second heat exchanger 220. To this end, the coolant line 250a penetrates the separator 250a. When a coolant-line passage hole 215c in FIG. 6 is formed in the separator 250a, the coolant line 240 may pass through the separator 250a. For example, the coolant-line passage hole 215c of the separator may be sealed through the process of welding after the coolant line 240 passes through the coolant-line passage hole 215c.

A temperature of the second gas entered into the second heat exchanger 220 may be lower than a temperature of the first gas entered into the first heat exchanger 210. In this case, a coolant line inlet 241 may be placed at the second heat exchanger 220, and a coolant line outlet 242 may be placed at the first heat exchanger 210. Conversely, a temperature of the second gas entered into the second heat exchanger 220 may be higher than a temperature of the first gas entered into the first heat exchanger 210. In this case, the coolant line inlet may be placed at the first heat exchanger, and the coolant line outlet may be placed at the second heat exchanger.

Effectively, heat exchanger occurs between coolants and relatively low temperature gases and then occurs between the coolants and relatively high temperature gases. In case heat exchange first occurs between coolants and relatively high temperature gases and then occurs between the coolants and relatively low temperature gases, a temperature of the coolants is higher than in the reverse case. Accordingly, efficiency of the following heat exchange between the coolants and relatively low temperature gases may be reduced.

Referring to FIG. 2, a first condensate storage container 213, 214 is placed on the bottom of the first heat exchanger 210, and a second condensate storage container 233 may be placed on the bottom of the second heat exchanger 220. Condensate generated in the first heat exchanger 210 is collected in the first condensate storage container 213, 214. Condensate generated in the second heat exchanger 220 is collected in the second condensate storage container 233.

To collect the condensate collected from each of the heat exchangers, a condensate discharge port to which a condensate discharge line is connected may be formed at each of the first condensate storage container and the second condensate storage container. In this case, a valve placed at the condensate discharge line has to be additionally provided to control discharge of condensate. Accordingly, an amount of power required for turn-on and turn-off operations of the valve is increased.

Accordingly, in some embodiments, the condensate discharge port 260 may be placed only at the second condensate storage container 233. In the second condensate storage container, condensate generated in the first heat exchanger 210 as well as condensate generated in the second heat exchanger 220 are stored.

The separator 250a includes a plurality of condensate discharge holes 215b in FIG. 6 to discharge the condensate generated in the first heat exchanger 210 to the second heat exchanger 220. The separator 250a, for example, may be a porous separator. The condensate discharge holes provided in the separator 250a may be pores formed due to properties of a material itself, or may be artificially formed holes. The condensate generated in the first heat exchanger 210 may fall into the second heat exchanger 220 through the condensate discharge holes of the separator 250a and may be stored in the second condensate storage container.

The first condensate storage container may include a guide part 213 and a storage part 214. The guide part 213 guides condensate generated in the first heat exchanger 210 to the storage part 214. The guide part 213 may have a cross section of a tapered shape in which a width of the guide part 213 becomes narrower towards a lower portion thereof.

The second gas entered into the second heat exchanger 220 under the separator 250a is likely to be mixed with the first gas in the first heat exchanger 210 on the separator 250a through the condensate discharge holes formed in the separator 250a. To prevent this from happening, in some embodiments, the guide part 213 of the first condensate storage container is coupled to an inner wall of the first heat exchanger and seals an edge portion of the first condensate storage container through the process of welding and the like, and seals a central portion of the first condensate storage container using the method of water sealing.

To apply the method of water sealing, water for sealing is stored in the storage part 214 of the first condensate storage container. To apply the method of water sealing more completely, a height of the water for sealing may be higher than a height of a lower end of the guide part. Additionally, a diameter of the storage part 214 may be smaller than a diameter of an upper portion of the guide part 213, and may be larger than a diameter of a lower portion of the guide part 213. Alternately, the separator 250a may be a bottom of the storage part 214 of the first condensate storage container. A part (a lower end portion) of the guide part 213 may be in the state of being immersed in the water for sealing stored in the storage part 214. The water for sealing may be supplied from the outside, and condensate stored in the storage part may be the water for sealing.

When an amount of generated condensate is increased as heat exchange is performed in the first heat exchanger 210 and the amount of generated condensate exceeds a maximum storage capacity of the storage part 214, the storage part 214 overflows. Condensate that overflows from the storage part 214 of the first condensate storage container may be discharged to the second heat exchanger 220 through the separator 250a.

Figure 3:
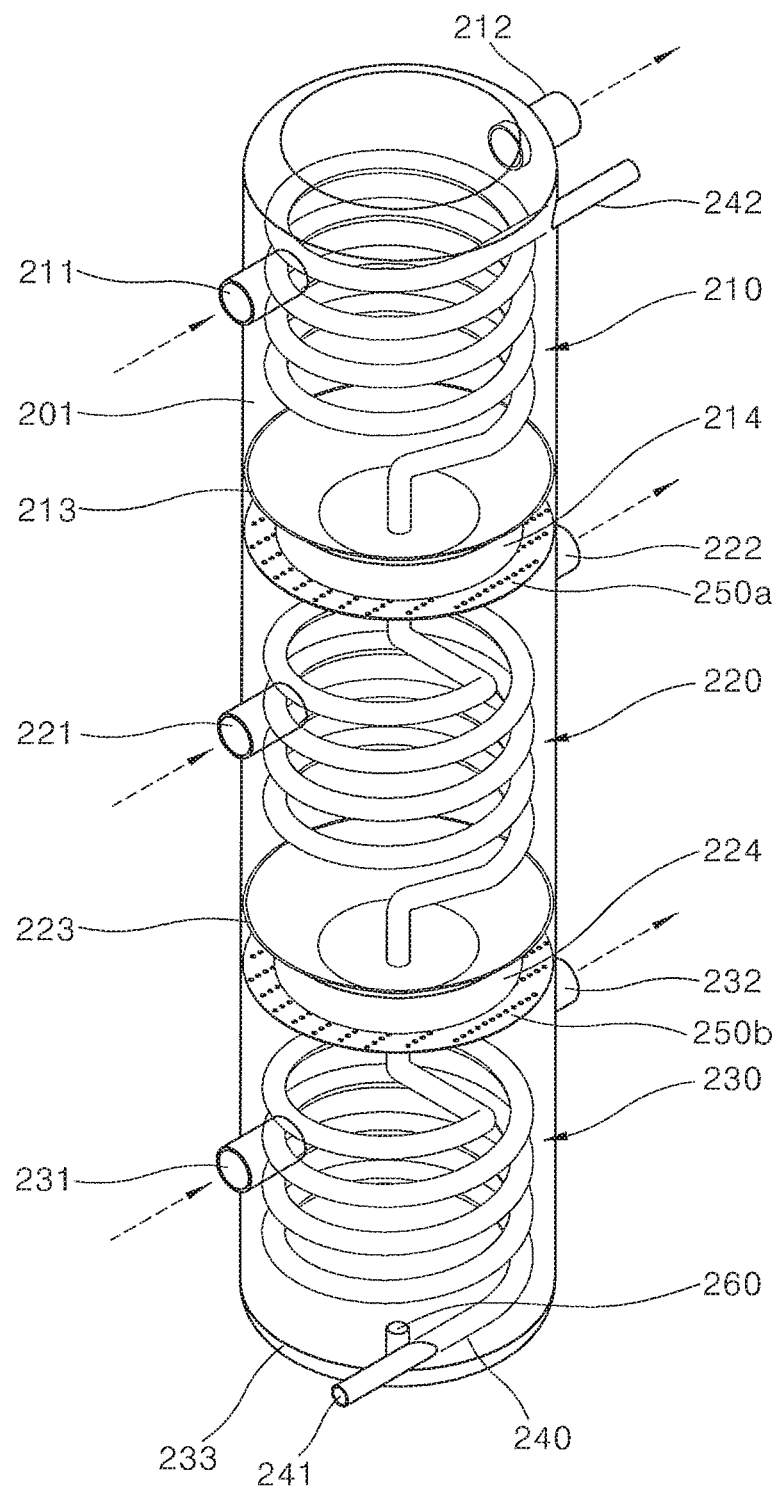
FIG. 3 is a schematic view illustrating another exemplary heat exchange device for a fuel cell system.
Figure 4:
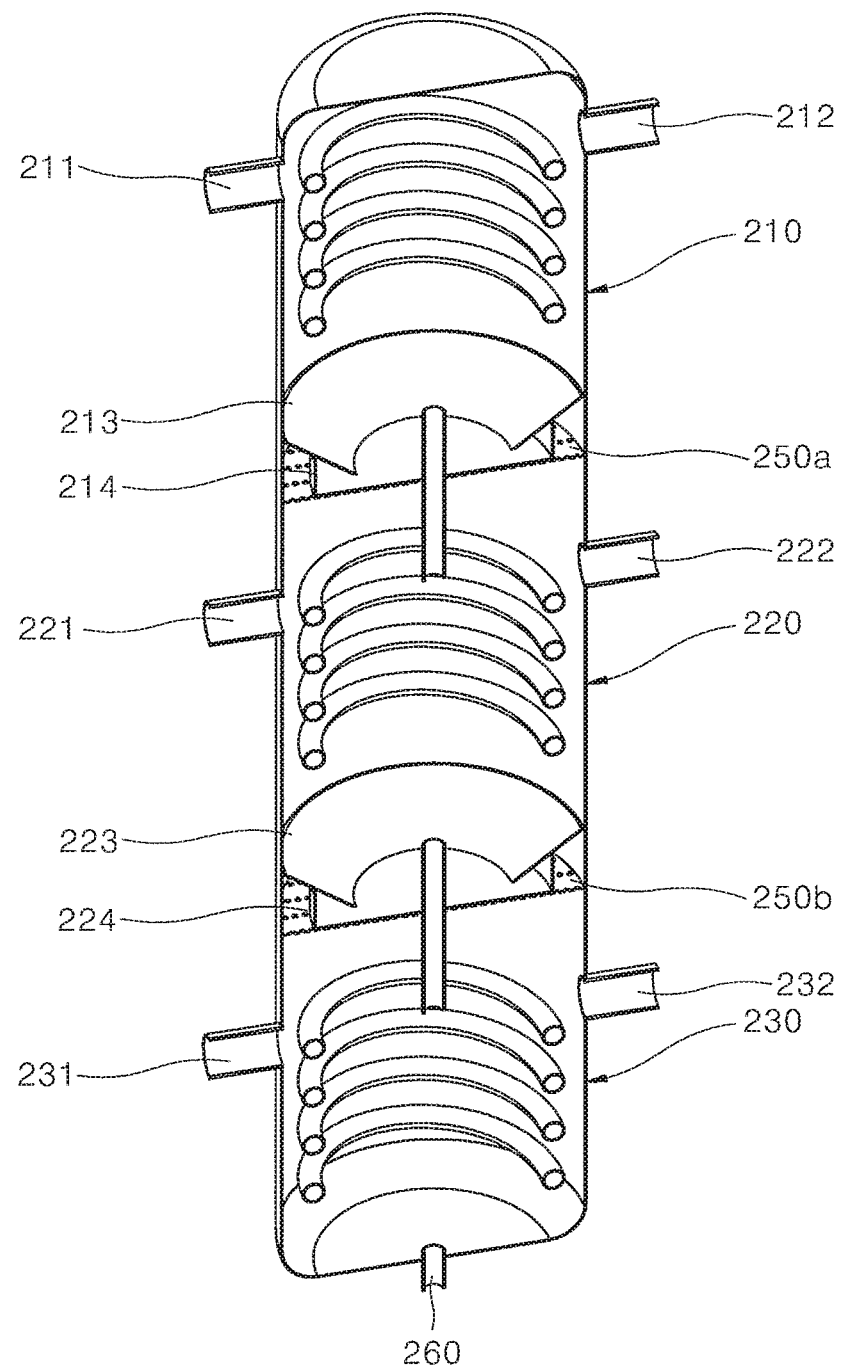
FIG. 4 is a cross-sectional view illustrating the heat exchange device for a fuel cell system in FIG. 3.

FIG. 3 is a schematic view illustrating another exemplary heat exchange device for a fuel cell system, and FIG. 4 is a cross-sectional view illustrating the heat exchange device for a fuel cell system in FIG. 3.

FIG. 2 illustrates an example in which a single heat exchange device includes two heat exchangers. However, the present disclosure is not limited. As illustrated in FIG. 3, a single heat exchange device may include three heat exchangers, and may include three or more heat exchangers.

Referring to FIGS. 3 and 4, the heat exchange device includes a first heat exchanger 210 at an upper portion thereof, a second heat exchanger 220 under the first heat exchanger and a third heat exchanger 230 under the second heat exchanger. A first gas inlet 211 is placed at one side of the first heat exchanger, and a first gas outlet 212 is placed at the other side of the first heat exchanger. A second gas inlet 221 is placed at one side of the second heat exchanger, and a second gas outlet 222 is placed at the other side of the second heat exchanger. A third gas inlet 231 is placed at one side of the third heat exchanger, and a third gas outlet 232 is placed at the other side of the third heat exchanger. The first heat exchanger 210, the second heat exchanger 220, and the third heat exchanger 230 may be respectively supplied with gases that are present in the fuel cell system and that have different temperatures, specifically, gases that are discharged from a reformer and a fuel cell stack and that have different temperatures.

The heat exchange device illustrated in FIGS. 3 and 4 includes a first separator 250a, and a second separator 250b. The first separator 250a forms a boundary surface between the first heat exchanger 210 and the second heat exchanger 220. The second separator 250b forms a boundary surface between the second heat exchanger 220 and the third heat exchanger 230. The first heat exchanger 210, the second heat exchanger 220, and the third heat exchanger 230 may be defined by a housing 201 and the separators 250a, 250b. That is, the first heat exchanger 210 may be defined by the housing 201 and the first separator 250a; the second heat exchanger 220 may be defined by the housing 201, the first separator 250a and the second separator 250b; the third heat exchanger 230 may be defined by the housing 201 and the second separator 250b.

The heat exchange device in FIG. 3 includes a coolant line 240. The coolant line 240 penetrates the first separator 250a and the second separator 250 to pass through all the first heat exchanger 210, the second heat exchanger 220 and the third heat exchanger 230.

A temperature of a second gas entered into the second heat exchanger 220 may be lower than a temperature of a first gas entered into the first heat exchanger 210, and a temperature of a third gas entered into the third heat exchanger 230 may be lower than a temperature of the second gas entered into the second heat exchanger 220. For example, approximately 150° C. of burner combustion gases discharged from the reformer are supplied to the first heat exchanger, approximately 100° C. of reformed gases discharged from the reformer are supplied to the second heat exchanger, and approximately 65° C. of exhaust gases discharged from a cathode are supplied to the third heat exchanger. In this case, an inlet 241 of the coolant line 240 is placed at the third heat exchanger 230, and an outlet 242 of the coolant line 240 may be placed at the first heat exchanger 210, such that heat exchange occurs first in relation to relatively low temperature gases.

To reduce the number of valves for controlling discharge of condensate, the first separator 250a and the second separator 250b may respectively include a plurality of condensate discharge holes 215b in FIG. 6. A condensate discharge port 260 connected to a condensate discharge line including a valve may be placed at the third heat exchanger 230. Though not illustrated in the drawings, for automatic operations of the condensate discharge line, a condensate level sensor may be placed at the third heat exchanger 230. For example, the valve of the condensate discharge line may be opened for a predetermined period of time in response to a signal from the condensate level sensor.

As illustrated in FIG. 3, a first condensate storage container 213, 214 may be placed on a bottom of the first heat exchanger 210, a second condensate storage container 223, 224 may be placed on a bottom of the second heat exchanger 220, and a third condensate storage container 233 may be placed on a bottom of the third heat exchanger 230. The first condensate storage container may include a guide part 210 and a storage part 214, and the second condensate storage container may include a guide part 223 and a storage part 224. The first heat exchanger 210 may be separated from the second heat exchanger 220 by the first condensate storage container 213, 214. Additionally, the second heat exchanger 220 may be separated from the third heat exchanger 230 by the second condensate storage container 223, 224.

Figure 5:
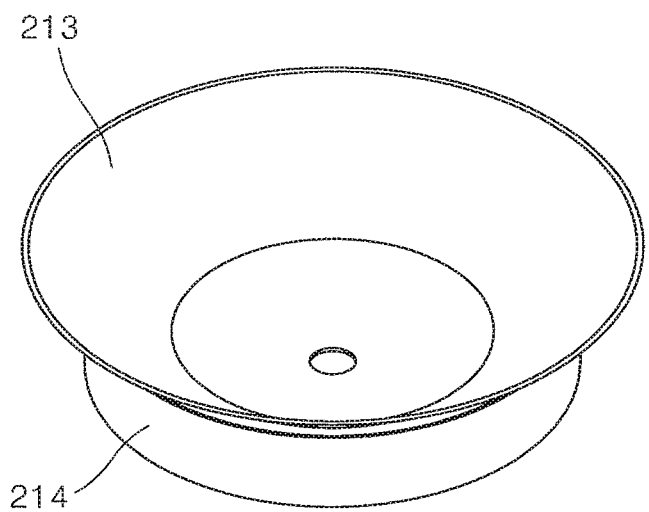
FIG. 5 is a view illustrating an example of a condensate storage container that is applicable to a heat exchange device for a fuel cell system according to the present disclosure.
Figure 5:
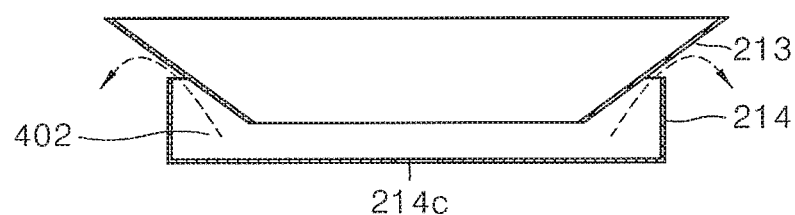

FIG. 5 illustrates an example of a condensate storage container that is applicable to a heat exchange device for a fuel cell system according to the present disclosure. The condensate storage container in FIG. 5 may be used as the first condensate storage container in FIG. 2. The condensate storage container in FIG. 5 may also be used as the first and second condensate storage containers in FIG. 3.

Referring to FIG. 5, the condensate storage container may include a guide part 213 and a storage part 214. The guide part 213 guides condensate generated in the first heat exchanger 210 to the storage part 214. The guide part 213 may have a cross section of a tapered shape in which a width of the guide part 213 becomes narrower towards a lower portion thereof. Water for sealing 402 is stored in the storage part 214 of the condensate storage container. A coolant line-passage hole 214c through which the coolant line passes is formed at the storage part 214. To apply the method of water sealing more completely, a level of water for sealing 402 is higher than a height of a lower end of the guide part. Additionally, a diameter of the storage part 214 may be smaller than that of the upper portion of the guide part 213, and may be larger than that of the lower portion of the guide part 213. That is, the lower end portion of the guide part 213 may be in a state of being immersed in the water for sealing stored in the storage part 214. In case an amount of condensate that is generated as heat exchange continuously occurs exceeds a maximum storage capacity of the storage part 214, the condensate overflows from the storage part 214. The condensate overflowing from the storage part may be discharged to the lower heat exchanger through condensate discharge holes of the separator.

FIG. 6 is a view illustrating an example of a separator that is applicable to a heat exchange device for a fuel cell system according to the present disclosure.

The separator 215 illustrated in FIG. 6 has a structure in which condensate may pass through the separator 215. The separator 215 includes a separator body 215a, a plurality of condensate discharge holes 215b and a coolant line-passage hole 215c.

The separator body 215a may be made of a material such as metal, ceramics, polymers and the like. As an example, the condensate discharge holes 215b may be pores formed due to properties of the separator body 215a like the separator body is made of porous ceramics. As another example, the condensate discharge holes 215b may be a hole that is formed in the separator body through the process of drilling. The coolant line-passage hole 215c is a hole that is formed to allow the coolant line to pass.

In some embodiments, the separator 215 in FIG. 6 may be placed under a bottom of a storage part of the condensate storage container. Alternately, the separator 215 in FIG. 6 may be the bottom of the storage part of the condensate storage container.

Figure 7:
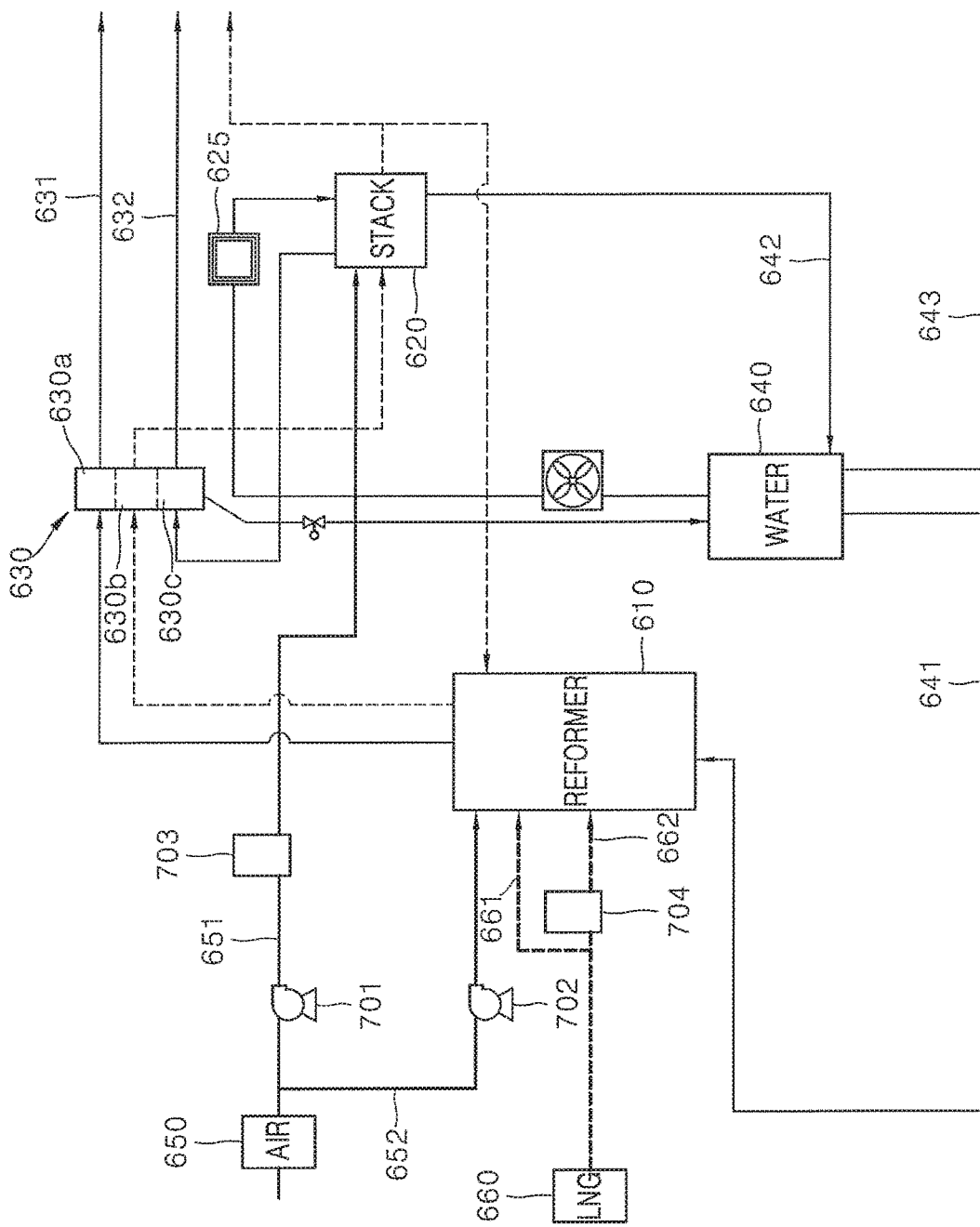
FIG. 7 is a schematic view illustrating an example of a fuel cell system according to the present disclosure.

FIG. 7 is a schematic view illustrating an example of a fuel cell system according to the present disclosure.

Referring to FIG. 7, the fuel cell system includes a reformer 610, a fuel cell stack 620 and a heat exchange device 630.

The reformer 610 change hydrocarbon fuels (e.g., LNG) into hydrogen and supplies the hydrogen to the fuel cell stack 620. The reformer 610 includes a reforming part and a burner part. Water is supplied to the reforming part of the reformer from a water storage part 640 through a supply line of water for reforming 641, and hydrocarbon-based fuels are supplied to the reforming part of the reformer from a fuel storage part 660 through a supply line of fuel for reforming 662. Hydrocarbon-based fuels are supplied to the burner part of the reformer from the fuel storage part 660 through a supply line of fuel for combustion 661, and air is supplied from an air storage part 650 through a supply line of air for combustion 652 to combust the hydrocarbon-based fuels. Through combustion and reforming reactions in the reformer, reformed gases and combustion gases are separated and discharged through a reformed gas-discharge line 611 and a combustion gas-discharge line 631 in the reformer 610.

The fuel cell stack 620 includes an anode that receives reformed gases from the reformer 610 through the reformed gas-discharge line 611, a cathode that receives air from the air storage part 650 or an additional air storage part through a supply line of air for a cathode 651, and an electrolyte that is placed between the anode and the cathode. A blower 701, 702 may be placed at the supply line of air 651, 652, and a flow controller (e.g., 703, 704) may be placed at the supply line of air, the supply line of fuel and the like. Additionally, coolants circulate in the fuel cell stack 620. A flow controller 625 or a radiator 626 and the like may be additionally placed at a coolant circulation line 642 to control a circulation of coolants or to adjust temperature.

Gases (Anode-off gas; AOG) that do not react in the anode of the fuel cell stack may be discharged outwards or may be supplied to the burner part of the reformer.

When necessary (a case in which an amount of water stored in the water storage part 640 is increased, and the like), water may be discharged through a water discharge line 643.

Structures and operations of the reformer 610 and the fuel cell stack 620 have already been disclosed in a large number of documents and may be modified in any way. Any structures and operations of a reformer and a stack may be adopted for the fuel cell system according to the present disclosure.

The fuel cell system in FIG. 7 includes a heat exchange device 630. The heat exchange device 630 includes three heat exchangers 630a, 630b, 630c as in FIG. 3. Alternately, the heat exchange device 630 may include two heat exchangers or may include four or more heat exchangers.

In the embodiment of FIG. 7, an inlet of the first heat exchanger 530a is connected to the combustion-gas discharge line 631; an inlet of the second heat exchanger 630b is connected to the reformed gas-discharge line 611; an outlet of the second heat exchanger 630b is connected to the anode of the stack 620; an inlet of the third heat exchanger 630c is connected to a cathode gas-discharge line 632. The outlet of the first heat exchanger 630a and the third heat exchanger 630c may be connected to the outside respectively.

Additionally, condensate discharged through the condensate discharge port of the third heat exchanger 630c may be supplied to the water storage part 640. Alternately, condensate may be discharged out of the fuel cell system.

The present disclosure has been described with reference to the embodiments illustrated in the drawings. However, the disclosure may be replaced, modified and changed by one having ordinary skill in the art to which the disclosure pertains in various different forms within the scope of the technical spirit of the disclosure. Therefore, the disclosure is not limited to the embodiments and the drawings set forth herein.

What is claimed is:

1. A heat exchange device for a fuel cell system, comprising:
   a first heat exchanger that collects heat contained in a first gas present in the fuel cell system;
   a second heat exchanger that is placed under the first heat exchanger and that collects heat contained in a second gas present in the fuel cell system and having a different temperature from the first gas;
   a separator that forms a boundary surface between the first heat exchanger and the second heat exchanger; and
   a coolant line that penetrates the separator to pass through all the first heat exchanger and the second heat exchanger.

2. The heat exchange device of claim 1, wherein an inlet of the coolant line is placed at the second heat exchanger, and an outlet of the coolant line is placed at the first heat exchanger, such that a temperature of a second gas entered into the second heat exchanger is lower than a temperature of a first gas entered into the first heat exchanger.

3. The heat exchange device of claim 1, further comprising:
   a first condensate storage container placed on a bottom of the first heat exchanger; and
   a second condensate storage container placed on a bottom of the second heat exchanger, and
   wherein the separator includes a plurality of condensate discharge holes through which condensate generated in the first heat exchanger is discharged to the second heat exchanger, and
   a condensate discharge port is placed at the second condensate storage container.

4. The heat exchange device of claim 3, wherein the first condensate storage container includes a storage part, and a guide part that guides condensate generated in the first heat exchanger to the storage part.

5. The heat exchange device of claim 4, wherein the guide part of the first condensate storage container is coupled to an inner wall of the first heat exchanger.

6. The heat exchange device of claim 4, wherein water for sealing is stored in the storage part of the first condensate storage container, and
   condensate overflowing from the storage part of the first condensate storage container is discharged to the second heat exchanger through the separator.

7. The heat exchange device of claim 3, wherein the separator has a porous structure.

8. A fuel cell system, comprising:
   a reformer from which reformed gases and combustion gases are separated and discharged;
   a fuel cell stack including an anode supplied with reformed gases from the reformer, a cathode receiving air, and an electrolyte placed between the anode and the cathode; and
   a multiple heat exchange device,
   the multiple heat exchange device, comprising:
   a first heat exchanger including a first gas inlet and a first gas outlet;
   a second heat exchanger placed under the first heat exchanger and including a second gas inlet and a second gas outlet;
   a first separator that forms a boundary surface between the first heat exchanger and the second heat exchanger; and
   a coolant line that penetrates the first separator to pass through all the first heat exchanger and the second heat exchanger, and
   wherein the first heat exchanger and the second heat exchanger of the multiple heat exchange device are respectively supplied with gases that are discharged from the reformer and the fuel cell stack and that have different temperatures.

9. The fuel cell system of claim 8, wherein a temperature of a second gas entered into the second heat exchanger is lower than a temperature of a first gas entered into the first heat exchanger, and
   an inlet of the coolant line is placed at the second heat exchanger, and an outlet of the coolant line is placed at the first heat exchanger.

10. The fuel cell system of claim 8, wherein the first separator includes a plurality of condensate discharge holes, and
a condensate discharge port is placed at the second heat exchanger.

11. The fuel cell system of claim 8, wherein the fuel cell system further includes a first condensate storage container placed on a bottom of the first heat exchanger, and a second condensate storage container placed on a bottom of the second heat exchanger, and
the first condensate storage container separates the first heat exchanger from the second heat exchanger.

12. The fuel cell system of claim 11, wherein the first condensate storage container includes a storage part, and a guide part that guides condensate generated in the first heat exchanger to the storage part.

13. The fuel cell system of claim 12, wherein the guide part of the first condensate storage container is coupled to an inner wall of the first heat exchanger.

14. The fuel cell system of claim 8, the multiple heat exchange device, further comprising:
a third heat exchanger placed under the second heat exchanger and including a third gas inlet and a third gas outlet; and
a second separator that forms a boundary surface between the second heat exchanger and the third heat exchanger,
wherein the coolant line further penetrates the second separator to further pass through the third heat exchanger,
gases that have different temperatures from temperatures of gases supplied to the first heat exchanger and the second heat exchanger are supplied to the third heat exchanger.

15. The fuel cell system of claim 14, wherein a temperature of a second gas entered into the second heat exchanger is lower than a temperature of a first gas entered into the first heat exchanger, and a temperature of a third gas entered into the third heat exchanger is lower than a temperature of a second gas entered into the second heat exchanger,
an inlet of the coolant line is placed at the third heat exchanger, and an outlet of the coolant line is placed at the first heat exchanger.

16. The fuel cell system of claim 14, wherein the first heat exchanger is connected to the reformer such that burner combustion gases are supplied to the first heat exchanger,
the second heat exchanger is connected to the reformer such that reformed gases are supplied to the second heat exchanger, and
exhausted gases discharged from the cathode are supplied to the third heat exchanger.

17. The fuel cell system of claim 14, wherein the first separator and the second separator respectively include a plurality of condensate discharge holes,
a condensate discharge port is placed at the third heat exchanger.

18. The fuel cell system of claim 14, wherein the fuel cell system further includes a first condensate storage container placed on a bottom of the first heat exchanger, a second condensate storage container placed on a bottom of the second heat exchanger, and a third condensate storage container placed on a bottom of the third heat exchanger,
the first condensate storage container separates the first heat exchanger from the second heat exchanger, and
the second condensate storage container separates the second heat exchanger from the third heat exchanger.

19. The fuel cell system of claim 18, wherein each of the first condensate storage container and the second condensate storage container has a storage part, and a guide part that guides condensate generated in the first heat exchanger to the storage part.

20. The fuel cell system of claim 19, wherein the guide part of the first condensate storage container is coupled to an inner wall of the first heat exchanger, and the guide part of the second condensate storage container is coupled to an inner wall of the second heat exchanger.

* * * * *